Patented Aug. 29, 1950

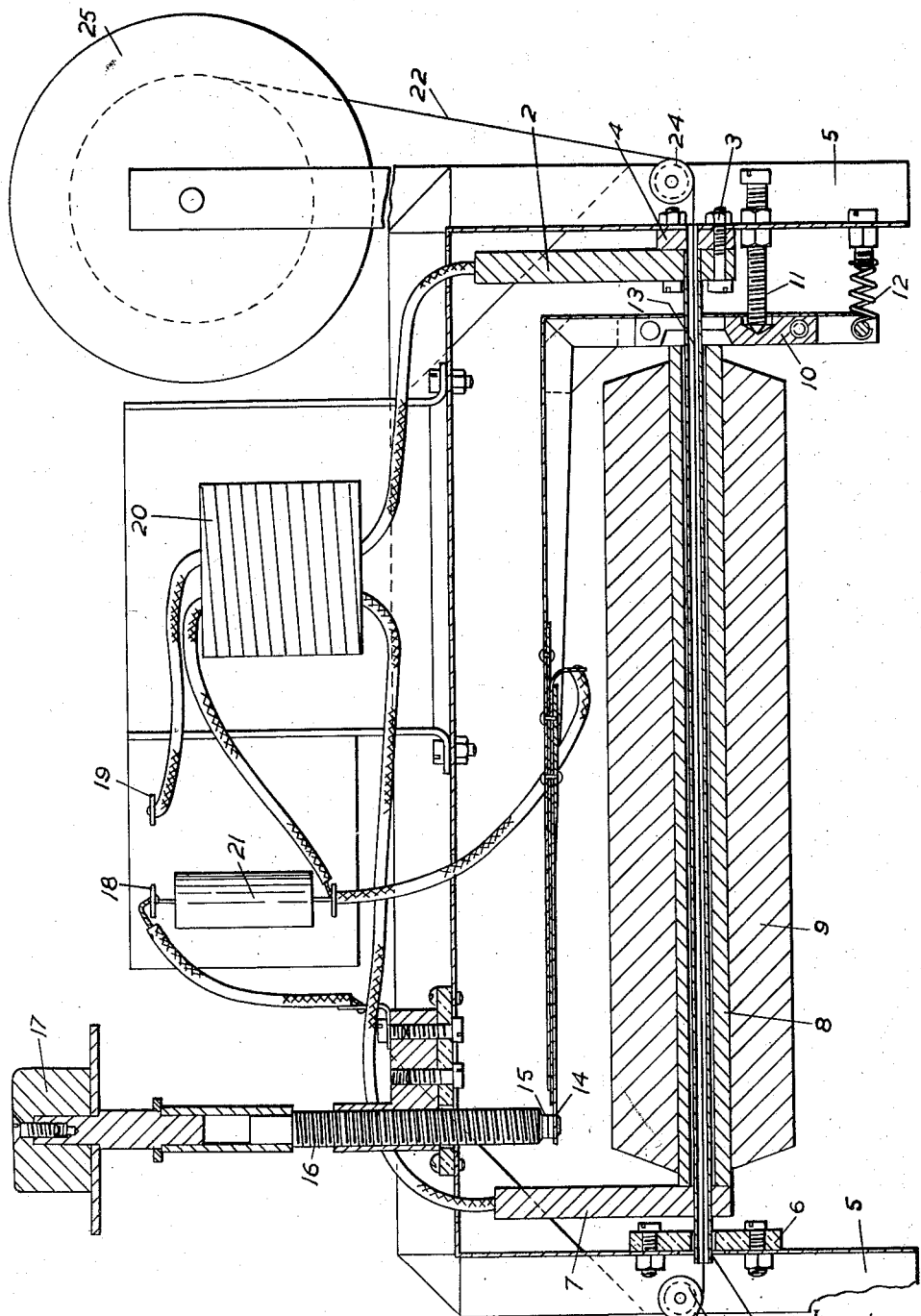

2,520,532

UNITED STATES PATENT OFFICE 2,520,532

ELECTRICALLY HEATED OVEN

James White Dalgleish and Frank Higginbottom, Cambridge, England, assignors to Pye Limited, Cambridge, England, a British company Application August 6, 1947, Serial No. 766,796 In Great Britain July 4, 1942

Section 1, Public Law 690, August 8, 1946 Patent expires July 4, 1962

10 Claims. (Cl. 219—35)

The present invention relates to ovens and more particularly to electrically heated ovens which are suitable for the processing of insulated electric conductors or wires for the purpose of drying, baking, condensing, or otherwise modifying, the insulating coating. The oven according to the invention is particularly suitable for the processing of wires covered with rayon or other artificial silk coverings.

An object of the invention is the economical thermal processing of insulated wire by apparatus which may conveniently be inserted in a continuous covering process, or, if desired, may be carried out independently in a rewinding operation. A further object is to provide the oven with a simple arrangement for thermostatically controlling its temperature at the desired value.

To this end, the invention consists in an electrically heated oven wherein the oven is heated by passing current through a conducting member forming at least a part of the oven wall, a member of lower coefficient of expansion than that of the conducting member being arranged adjacent thereto, and wherein means controlled by the differential expansion of the two members actuates switching means controlling the current flowing through the conducting member, and thereby thermostatically controls the temperature of the oven.

A feature of the invention consists in an electrically heated oven for processing insulated electric conductors comprising a tubular oven passage through which the wire or wires to be processed pass axially the length of the oven passage being great compared with its internal cross-section, a heating surface or member extending along or constituting the wall of said passage, means for passing an electric current through said heating surface or member to heat it, and means responsive to the longitudinal expansion of said heating surface or member to control the supply of electric current thereto, and thus thermostatically to control the oven temperature. The heating surface or member may lie adjacent to or be embraced by a member having a lower coefficient of expansion the differential expansion of the two members being used to control the supply of electric current to the heating surface or member.

In one embodiment of the invention the oven is of tubular form through which one or more wires to be processed pass axially, the length of the tubular oven being great compared with its internal cross-section, the latter being kept as small as possible having regard to the size and number of wires which it is required to process. The oven conveniently consists of a tube of nickel or other suitable metal and is heated by passing an electric current along its length. The thermostatic control of the oven temperature is effected by employing the differential thermal expansion of the oven tube and a freely fitting sleeve or fused quartz (or other suitable material having a lower coefficient of expansion than that of the oven tube) which embraces the oven tube, to operate directly or through a suitable link mechanism a pair of electrical contacts or a switch arranged to control the heating current of the oven either directly or indirectly by means of relays, amplifiers or other control devices. The quartz tube serves to provide thermal insulation on the outside of the oven tube but if this is insufficient in itself it may be further surrounded by thermal insulating material.

If necessary, baffles may be arranged at the ends of the tube so that the wire or wires may be fed to and brought away from the oven without permitting free passage of air through the oven, thereby minimising the effects of draughts and air currents surrounding the oven. Pulleys may be provided for guiding and supporting the wires where they pass into and out of the oven.

In order that the invention may be more clearly understood, an embodiment thereof will now be described, by way of example, with reference to the accompanying drawing.

Referring to the drawing, the oven comprises a nickel tube 1 which is soldered at one end to a copper end piece 2 which is bolted by means of the bolts 3 and with the interposition of a spacer 4 to the framework 5 of the oven. The spacer 4 has an aperture in its centre approximately equal to the internal diameter of the nickel tube.

The opposite end of the nickel tube is mounted in a longitudinally slidable manner in an insulated guide 6 bolted to the frame 5 a second copper end piece 7 being soldered a short distance away from this end of the nickel tube.

Surrounding the nickel tube is a sleeve 8 of quartz which is a loose fit and slidable along the nickel tube. The quartz sleeve is in turn surrounded by thermal insulating lagging 9.

One end of the quartz tube bears against the copper end piece 7 being pressed thereagainst by the lever arm 10 which is fulcrumed about the pointed end of the screw 11 and urged in the anti-clockwise direction by the spring 12. The lever arm 10 engages with the end of the quartz tube through the hardened steel knife edge portions 13. The upper end of the lever arm is cranked as shown, the end above the oven tube being provided with an insulated contact 14 which is adapted to engage with the contact 15 carried at the end of a micrometer screw 16 adjustable by the knob 17.

Electric current for heating the oven is supplied to the terminals 18 and 19, the terminal 19 being directly connected to one end of the primary winding of the transformer 20 whilst the terminal 18 is either connected through the contacts 14 and 15 to the other end of the primary winding of the transformer or, when these contacts are open through the resistance 21 to the other end of the primary winding. The ends of the secondary winding of the transformer 20 are connected to the copper end pieces 2 and 7 respectively.

The wire 22 to be processed is fed to the oven over the pulley 23 and passes axially through the nickel tube to the pulley 24, being wound up upon the spool 25 carried by the framework 5.

The mode of operation of the oven is as follows. The micrometer screw 16 is adjusted so that, when the oven is cold, contacts 14 and 15 are closed. In this position full current is fed to the transformer 20 and the nickel tube becomes rapidly heated. As the tube becomes hotter it expands towards the left by its lefthand end sliding through the guide 6. The pressure exerted by the spring 12 on the knife edges 13 keeps the quartz tube in contact with the left hand copper end piece 7, and since the quartz tube has a much lower coefficient of expansion than that of the nickel tube the lever arm 10 will turn in an anticlockwise direction with increase in oven temperature. The position of the contact 15 is so adjusted by the micrometer screw 16 that the lever arm 10 will move the contact 14 away from the contact 15 when the desired oven temperature is reached. When the contacts 14 and 15 open, current flows to the transformer through the resistance 21 thus reducing the current fed to the nickel tube which gradually cools off, the differential contraction between the nickel tube and the quartz tube moving the lever arm 10 in a clockwise direction again to close the contacts 14 and 15 to apply full current for heating the oven.

By means of the arrangement according to the invention the oven temperature may be maintained within very close limits, the peak temperature being adjusted by the setting of the micrometer screw 16.

Although a particular embodiment of the invention has been described by way of example it will be understood that various modifications may be made without departing from the scope of the invention as defined by the appended claims. For example instead of employing a nickel tube, the heating may be effected by one or more flat strip conductors lying adjacent the internal surface of the quartz tube and kept under tension by a spring pressed lever such that the differential expansion of the ribbon conductor and the quartz tube allows the lever to pivot to operate current controlling contacts in a manner similar to that described above. In this case of course, the oven wall is constituted in part by the ribbon conductor and in part by the internal surface of the quartz tube. The internal surface of the quartz tube may be rectangular with a ribbon conductor arranged along some or all of the internal faces thereof and the heating current may be arranged to flow in one direction through one or some of the conductors and return through the other conductor or conductors in the opposite direction. Since the temperature of all the conductors will be substantially equal it is sufficient to actuate the temperature controlling contacts by the expansion of only one of the ribbon conductors.

We claim:

1. An electrically heated oven wherein the oven is heated by passing current through a conducting member forming at least a part of the oven wall, a member of lower coefficient of expansion than that of the conducting member being arranged adjacent thereto, and wherein means controlled by the differential expansion of the two members actuates switching means controlling the current flowing through the conducting member, and thereby thermostatically controls the temperature of the oven.

2. An electrically heated oven as claimed in claim 1, comprising a metal tube which is long compared with its internal cross-section, means for passing an electric current along the tube to heat it, a sleeve of material having a low coefficient of expansion freely embracing the metal tube, and means operated by the differential expansion of the metal tube and the sleeve for controlling the supply of electric current to the metal tube.

3. An electrically heated oven for processing insulated electric conductors comprising a tubular member defining an oven passageway through which the wire to be processed passes axially, the length of the oven passageway being great compared with its internal cross-section a heating member extending along the wall of said passageway, means for passing an electric current through said heating member to heat it, and means responsive to the longitudinal expansion of said heating member to control the supply of electric current thereto and thus thermostatically to control the oven temperature.

4. An electrically heated oven as claimed in claim 3, wherein the heating member lies adjacent to a member having a lower coefficient of expansion, the differential expansion of the two members being used to control the supply of electric current to the heating member.

5. An oven as claimed in claim 4, wherein the member having the lower coefficient of expansion is of tubular form, the heating member lying adjacent the internal surface of the tube and being kept under tension by means which move in accordance with the differential expansion of the member and the tubular member thereby to actuate switching means controlling the supply of electric current to the member.

6. An oven as claimed in claim 5, wherein the movement due to the differential expansion of the heating member and the adjacent member, actuates a lever mechanism controlling the opening and closing of contacts controlling the supply of electric current to the heating member.

7. Oven as claimed in claim 2, wherein the metal tube is fixed to a support at one end the other end being free to move longitudinally and carrying an end piece against which bears one end of the sleeve, the other end of the sleeve bearing against a part of a lever mechanism which is carried by the support and is resiliently pressed against the end of the sleeve, and switch contacts actuated by the movement of said lever mechanism for controlling the supply of electric current to said metal tube.

8. An oven as claimed in claim 7, wherein one of the current controlling contacts is adjustable so as to adjust the temperature at which the oven is thermostatically controlled.

9. An electrically heated oven for processing insulated electric conductors comprising a tubular member defining an oven passageway through which the wire to be processed passes axially, the length of the oven passageway being great compared with its internal cross-section, a heating member constituting the wall of said passageway, means for passing an electric current through said heating member to heat it, and means responsive to the longitudinal expansion of said heating member to control the supply of electric current thereto and thus thermostatically to control the oven temperature.

10. An electrically heated oven as claimed in claim 9, wherein the heating member is embraced by a member having a lower coefficient of expansion, the differential expansion of the two members being used to control the supply of electric current to the heating member.

JAMES WHITE DALGLEISH.
FRANK HIGGINBOTTOM.

REFERENCES CITED

The following references are of record in the file of this patent:

UNITED STATES PATENTS

| Number | Name | Date |
|---|---|---|
| 496,208 | Procunier | Apr. 25, 1893 |
| 1,064,138 | Ford | June 10, 1913 |
| 1,884,232 | Rehm | Oct. 25, 1932 |
| 1,991,171 | Newton | Feb. 12, 1935 |
| 2,373,550 | Dalgleish | Apr. 10, 1945 |